Patented July 31, 1945

2,380,400

UNITED STATES PATENT OFFICE 2,380,400

POLYMERIZATION OF BUTADIENE-1,3 HYDROCARBONS

George L. Browning, Jr., Akron, Ohio, assignor, by mesne assignments, to The B. F. Goodrich Company, Akron, Ohio, a corporation of New York No Drawing. Application September 22, 1941, Serial No. 411,848

10 Claims. (Cl. 260—84.5)

This invention relates to the polymerization of butadiene-1,3 hydrocarbons, and particularly to a method whereby butadiene-1,3 hydrocarbons may be polymerized in aqueous emulsion to form products closely resembling natural crude rubber.

The emulsion polymerization of butadiene-1,3 hydrocarbons either alone or in admixture with other monomers copolymerizable therewith to form compositions of matter more or less resembling rubber is well known. It has been commonly observed, however, that the products of such polymerization reactions often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, non-plastic materials which either would not homogenize on a mill or which were very difficult to mill and to subject to other ordinary processing operations.

I have now discovered a class of materials which modifies the emulsion polymerization of butadiene-1,3 hydrocarbons in such a manner that polymers more nearly resembling natural crude rubber may be produced than when the polymerization is effected in the absence of the materials of this invention. This class of materials, which I have termed "modifiers," consists of compounds containing the group

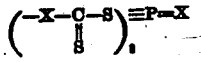

wherein X represents oxygen or sulfur. Compounds containing this group may be readily prepared by the reaction of an alkali metal xanthate with a phosphorus oxyhalide or a phosphorus thiohalide such as phosphorus oxychloride, phosphorus oxybromide, or thiophosphoryl chloride (S=P≡Cl₃). The reaction of potassium ethyl xanthate and phosphorus oxychloride is described by Richter, B. 49, 1028 (1916). Analogous reactions may be employed to produce other modifiers herein described. The xanthate may be derived from an alcohol or a thiol such as ethanol, allyl alcohol, cyclohexyl alcohol, tetrahydrofurfuryl alcohol, benzyl alcohol, isopropyl mercaptan, etc., by a reaction with carbon disulfide and an alkali in known manners. The tris(alkoxythiono)trithiophosphates such as tris(ethyloxythiono)trithiophosphate represented by the structural formula

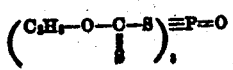

tris(isopropoxythiono)trithiophosphate, tris(tertbutyloxythiono)trithiophosphate, and the tris-(alkoxythiono)tetrathiophosphates such as tris-(ethoxythiono)tetrathiophosphate,

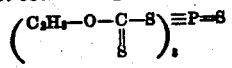

are the preferred classes of compounds because of their comparatively low cost and the ease with which they may be prepared, but any other compound containing the group

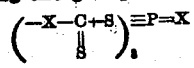

may be employed if desired.

As a specific example of this invention, a mixture of 55 parts by weight of butadiene and 45 parts of acrylonitrile was agitated at 30° C. in the presence of about 250 parts of an aqueous solution of myristic acid which had been about 85% neutralized with sodium hydroxide, 0.35 part of hydrogen peroxide as an initiator, 0.1 part of sodium ferri pyrophosphate as a catalyst, and 1.0 part of tris(isopropoxythiono)trithiophosphate. Coagulation of the latex-like dispersion obtained as the product yielded a plastic, coherent polymer which was 95.8% soluble in acetone. Repetition of the above experiment in the absence of a modifier produced a polymer which was non-plastic, non-coherent, and which was only 1% soluble in acetone. When the modified polymer was compared further with the unmodified polymer, it was found that the modified polymer was much easier to work on the mill, the dispersion of the pigments in the modified polymer was considerably better, and the tensile strength and elongation of a vulcanizate prepared from the modified polymer were much higher. Other modifiers such as tris(tetrahydrofurfuryloxythiono)trithiophosphate, tris(ethoxythiono)tetrathiophosphate, and tris(isopropoxythiono)tetrathiophosphate may be employed as the modifier with equivalent results.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or more may advantageously be employed. It may also be advantageous to employ a mixture of the modifiers herein claimed with each other or with other known types of modifiers such as tetraalkyl thiuram polysulfides, mercaptoalkylthiazoles or other types of compounds known to exhibit modifying activity in emulsion polymerizations.

The modifying agents of this invention may be employed in the polymerization in the form of an aqueous emulsion of butadiene-1,3 hydrocarbons, by which is meant butadiene-1,3 (commonly termed butadiene) and its homologues which enter into polymerization reactions in essentially the same manner such as isoprene, piperylene, and 2,3-dimethylbutadiene, either alone or in admixture with each other and/or other monomers copolymerizable therewith such as styrene, isobutylene, acrylonitrile, methyl methacrylate, methyl acrylate, methyl vinyl ether, methyl vinyl ketone, and other unsaturated hydrocarbons, esters, ethers, and ketones. For the production of rubbery products, these other monomers should be employed in an amount smaller than the butadiene.

The polymerization of the above materials in aqueous emulsion may be effected by various initiators of polymerization such as per-compounds including per-acids, peroxides, and per-salts such as persulfates, perborates, percarbonates, and the like as well as other types of initiators such as diazoaminobenzene, bisulfites, hydrosulfites, and dipotassium diazomethane disulfonate.

The polymerization reactions may be catalyzed in any desired manner, the use of heavy metal catalysts being particularly desirable. The heavy metal catalyst may be added to the emulsion in the form of less than 0.1% based on the weight of the monomers of a simple ionizable heavy metal salt such as cobalt chloride, nickelous sulfate, mercuric chloride, etc., as disclosed in the copending application of William D. Stewart, Serial No. 379,712 filed February 14, 1941, or in the form of a redox system comprising a heavy metal and a material such as sodium pyrophosphate, levulinic acid, glycine, cystine, beta-mercaptoethanol, quebrachitol, ox-bile or cholesterol as disclosed in the copending application of William D. Stewart, Serial Nos. 379,713 to 379,717 filed February 14, 1941.

Any of the emulsifying agents known to be useful in connection with the emulsion polymerization of butadiene hydrocarbons may be employed. The polymerizations may be effected under acid conditions by employing as emulsifying agents salts of organic bases containing long carbon chains such as the hydrochloride of diethylaminoethyloleylamide, the hydrochloride of the diethylaminoethoxyanilide of oleic acid, trimethylcetylammonium sulfate, etc.; under alkaline conditions by employing soaps such as sodium oleate, sodium myristate, potassium palmitate, etc., and under acid, alkaline, or neutral conditions by employing synthetic saponaceous materials such as hymolal sulfates or alkaryl sulfonates including sodium lauryl sulfate, sodium isobutyl naphthalene sulfate, etc.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing a butadiene-1,3 hydrocarbon in the form of an aqueous emulsion in the presence of a small amount of a compound containing the group

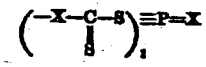

wherein X is a member of the group consisting of oxygen and sulfur.

2. The method which comprises polymerizing in the form of an aqueous emulsion a mixture of butadiene and a smaller amount of a monomer copolymerizable therewith in aqueous emulsion, in the presence of a small amount of a compound containing the group

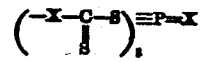

wherein X is a member of the group consisting of oxygen and sulfur.

3. The method which comprises polymerizing in the form of an aqueous emulsion a mixture of a butadiene-1,3 hydrocarbon and a smaller amount of a monomer copolymerizable therewith in aqueous emulsion, in the presence of a tris(alkoxythiono) trithiophosphate.

4. The method which comprises polymerizing in the form of an aqueous emulsion a mixture of a butadiene-1,3 hydrocarbon and a smaller amount of a monomer copolymerizable therewith in aqueous emulsion, in the presence of tris(isopropoxythiono) trithiophosphate.

5. The method which comprises polymerizing in the form of an aqueous emulsion a mixture of a butadiene-1,3 hydrocarbon and a smaller amount of a monomer copolymerizable therewith in aqueous emulsion, in the presence of a tris(alkoxythiono) tetrathiophosphate.

6. The method which comprises polymerizing a mixture of butadiene and a smaller amount of acrylonitrile in the form of an aqueous emulsion in the presence of a compound containing the group

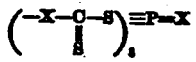

wherein X is a member of the group consisting of oxygen and sulfur.

7. The method which comprises polymerizing a mixture of butadiene and a smaller amount of acrylonitrile in the form of an aqueous emulsion in the presence of a tris(alkoxythiono) trithiophosphate.

8. The method which comprises polymerizing a mixture of butadiene and a smaller amount of acrylonitrile in an aqueous emulsion in the presence of tris(isopropoxythiono) triththiophosphate.

9. The method which comprises polymerizing a mixture of butadiene and a smaller amount of acrylonitrile in an aqueous emulsion in the presence of a tris(alkoxythiono) tetrathiophosphate.

10. The method which comprises polymerizing a mixture of butadiene and a smaller amount of styrene in an aqueous emulsion in the presence of a tris(alkoxythiono) trithiophosphate.

GEORGE L. BROWNING, Jr.